United States Patent [19]

Fitzpatrick

[11] Patent Number: 4,725,448

[45] Date of Patent: Feb. 16, 1988

[54] APPLICATION OF ELECTRICALLY-CHARGED LIGHT-ABSORBING PARTICLES TO A LENTICULAR SCREEN

[75] Inventor: Brian J. Fitzpatrick, Ossining, N.Y.

[73] Assignee: North American Philips Corporation, New York, N.Y.

[21] Appl. No.: 938,665

[22] Filed: Dec. 5, 1986

[51] Int. Cl.⁴ .............................................. B05D 3/02
[52] U.S. Cl. .................................... 427/45.1; 350/126; 350/127; 350/128; 350/129; 430/42; 430/97
[58] Field of Search ............... 427/45.1; 350/126, 127, 350/128, 129; 430/42, 97

[56] References Cited

U.S. PATENT DOCUMENTS 4,573,764  4/1986  Bradly ................................ 350/128
4,605,283  8/1986  Stanton .............................. 350/127

Primary Examiner—Thurman K. Page
Assistant Examiner—Leon R. Horne
Attorney, Agent, or Firm—Robert J. Kraus

[57] ABSTRACT

A method for selectively applying light-absorbing particles to a lenticular, light-transmissive screen, such as a projection television screen. The particles are charged and are selectively deposited in grooves between lenticules of the screen by electrically charging the lenticule peaks to the same polarity, to effect repulsion, and then depositing the particles onto the screen. The particles consist essentially of a material having a substantially higher microwave absorption coefficient than the screen material and have heat-fusible outer surfaces. After deposition, the particles are selectively heated by generally-applied microwave radiation, until they fuse to each other and to the screen.

9 Claims, 3 Drawing Figures

APPLICATION OF ELECTRICALLY-CHARGED LIGHT-ABSORBING PARTICLES TO A LENTICULAR SCREEN

CROSS REFERENCE TO RELATED APPLICATIONS

This application is filed concurrently with application Ser. No. 938,664, issued Sept. 8, 1987, Pat. No. 4,692,359, Ser. No. 938,669, of the same inventor, which are hereby incorporated by reference.

BACKGROUND OF THE INVENTION

1. Field of the Invention

The invention relates to light-transmissive viewing screens, and in particular to lenticular screens having light-absorbing material disposed in grooves between the lenticules of the screen.

2. Description of the Prior Art

Light-transmissive viewing screens such as rear projection screens are commonly provided with integral lenticules or lens elements. These lens elements are shaped to collect image-forming light rays projected onto the rear side of the screen by one or more projection tubes, and to concentrate the rays to form a bright image at the peaks of lens elements on the front or viewing side of the screen.

It is Well known that providing a coating of masking material in grooves between the light-emitting lens elements, to absorb ambient light, enhances image contrast. Examples of lenticular screens with such masking material are described in commonly-owned U.S. Pat. No. 4,605,283 to Douglas A. Stanton, which is hereby incorporated by reference. The Stanton patent recognizes the desirability of minimizing contact of the masking material with the screen surfaces defining the grooves. The masking material not only absorbs ambient light incident to the masked grooves at the viewing side of the screen, but also partially absorbs the image-forming light entering the lens elements from the rear of the screen, thereby attenuating the image-forming light eventually reaching the light-emitting peaks of the lens elements. This attenuation occurs wherever the masking material contacts the surface of a lens element, thereby locally increasing the critical angle for total internal reflection (TIR) of light rays striking the rear of the lens elements. As is explained in the Stanton patent, this increase of the critical angle decreases the range of angles from which image-forming light rays received at the rear of the screen will be totally reflected toward the light-emitting peaks of the respective lens elements. To minimize the total area of each lens element contacted by the masking material, thus minimizing the total surface area of the screen for which the TIR is reduced, the Stanton patent proposes that the masking material be provided in the form of a multiplicity of small light-absorbing particles. Each particle makes minimal contact (e.g. point contact) with the outer surface of the lens element against which it is disposed, and the particles are contained within each groove by a layer extending between respective sidewalls of the lens elements which define the groove.

Selective deposition of the light-absorbing masking particles into the grooves of a lenticular screen such as that disclosed in the Stanton patent can be achieved by reasonably simple methods. Any particles which land on the rounded peaks of the disclosed lens elements can be wiped or jarred off and tend to drop into the grooves. However, selective deposition is more difficult with screens having peaks with concave central portions, such as are described in U.S. Pat. No. 4,573,764 to Ralph H. Bradley, which is hereby incorporated by reference. With such screens it has been found difficult to keep the deposited particles out of the concave portions of the peaks. It has also been found difficult to achieve uniform filling of the grooves with the particles. Both of these objectives must be achieved in order to ensure high brightness and high contrast of images formed on the screen.

Another problem experienced is associated with retaining the particles in the grooves without damaging the screen. In the Stanton screen masking arrangement, the layer containing the particles in each groove is preferably formed by heating the face of the screen until the uppermost particles in each groove fuse together. There is only a small margin of error between applying sufficient heat energy to fuse the uppermost particles into a layer and overheating the screen material (typically a plastic material such as polymethyl methacrylate) and causing optical distortion of the lenticules.

SUMMARY OF THE INVENTION

It is an object of the invention to provide a simple but effective method for selectively applying light-absorbing masking particles to the grooves of a light-transmissive, lenticular screen.

It is a further object of the invention to provide such a method which both minimizes the deposition of the particles on the light-emitting peaks and which effects uniform coating of the groove areas to be masked.

It is yet another object of the invention to securely affix the particles to the screen while both minimizing contact of the particles with the screen and preventing excessive heating of the screen.

In accordance with the invention, these and other objects are achieved by electrically guiding the particles to the groove areas and then affixing the particles without applying heat to the screen. The particles are guided to the groove areas by electrically charging the lenticule peaks with a charge having a predetermined polarity and then depositing onto the screen a quantity of the particles, which have been electrically charged to the same polarity as the peaks. It has been found that the magnitudes of the electrical charges which can be accumulated on even the small lenticule peaks and particles involved are sufficiently large to effect repulsion of the particles from the peaks. Particle deposition continues until the grooves are filled to a predefined level. The particles are affixed by selectively heating them until they fuse to each other and to points of contact with the lenticule sidewalls.

In a preferred embodiment of the invention, the lenticule peaks are electrically charged by operating a corona discharge device near the peaks, and the charged particles are obtained by utilizing already-charged particles such as are commonly available for use as toner particles in electrophotographic copying machines. Typically, such particles have an inner core of magnetically-permeable material, and are covered with an outer layer of heat-fusible, light absorbing material. The particles are then affixed to the screen by transfusing the screen and the particles with microwave radiation of sufficient energy to fuse the particles to each other and to the screen. This radiation selectively heats the particles because their cores of magnetically-permeable material have a microwave absorption coefficient which is substantially higher than that of the screen material. Conversely, the screen absorbs relatively little of the microwave energy, and is not sufficiently heated to effect distortion of the lenticules.

BRIEF DESCRIPTION OF THE DRAWING

The invention will now be described with reference to exemplary drawing figures, of which.

DESCRIPTION OF THE PREFERRED EMBODIMENT

Figure 1:
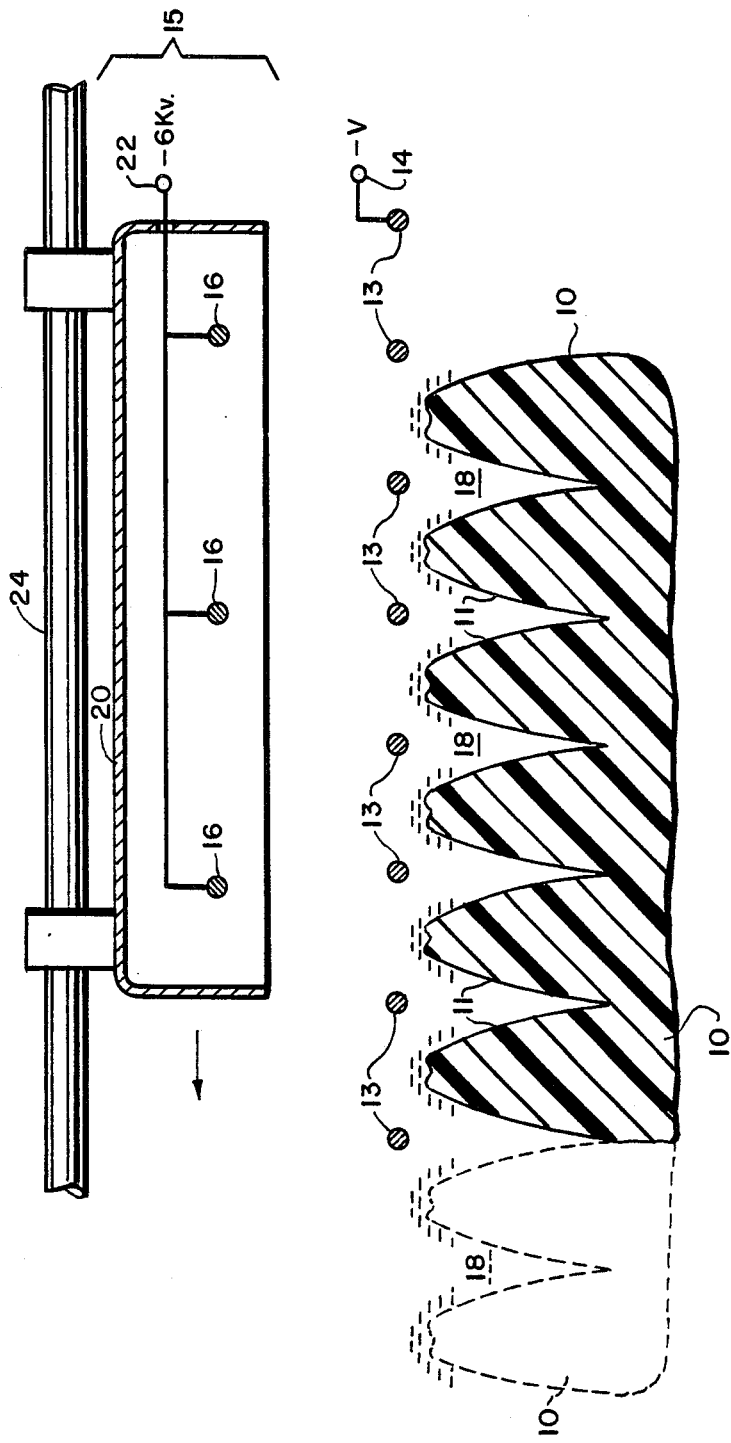
FIG. 1 illustrates electrical charging of lenticule peaks of a screen, shown in cross section.

FIG. 1 illustrates a preferred technique for charging the lenticule peaks of the screen. In accordance with this technique, a screen 10 having lenticules 11 is situated at a charging station which incorporates a corona charging device such as that described in U.S. Pat. No. 3,475,169, which is hereby incorporated by reference. This device includes a multiplicity of parallel grid conductors 13 electrically-connected to a terminal 14, and an ionizing device 15 positioned above the screen 10 and having a plurality of grid conductors 16 arranged parallel to the grid conductors 13.

A grid conductor 13 is disposed immediately above each screen groove 18, and runs the entire length of the groove. The grid conductors 16 also have lengths approximately equal to the groove lengths, but are partially enclosed in a grounded housing 20 and are electrically connected to a terminal 22. The housing 20 with the grid conductors 16 is movably mounted on a rail 24, enabling scanning of the housing across all of the grooves 18 in the screen.

In operation, a negative high voltage of approximately −6 Kv is applied to grid conductors 16 via terminal 22 while the ionizing device 15 is scanned across the peaks of the screen in the direction indicated by the arrow. Simultaneously, a negative voltage −V of much lower magnitude is applied to grid conductors 13 via terminal 14. The voltage applied to grid conductors 16 is sufficiently high to establish a corona discharge, and a negative ion cloud is formed in the space between the arrangement of grid conductors 13 and the arrangement of grid conductors 16. The negative ions in the cloud tend to pass to the screen through the grid formed by the conductors 13, but the negative potential applied to these conductors deflects the negative ions toward the peaks of the lenticules 11, thereby effectively shielding the grooves 18 and establishing negative charging of the peaks. The magnitude of the voltage −V is adjusted to a value necessary to achieve the desired deflection for the particular peak and groove dimensions and for the distance of the conductors 13 from the screen. Preferably, the ionizing device 15 is repeatedly scanned across the screen to obtain uniform negative charging of the lenticule peaks.

Figure 2:
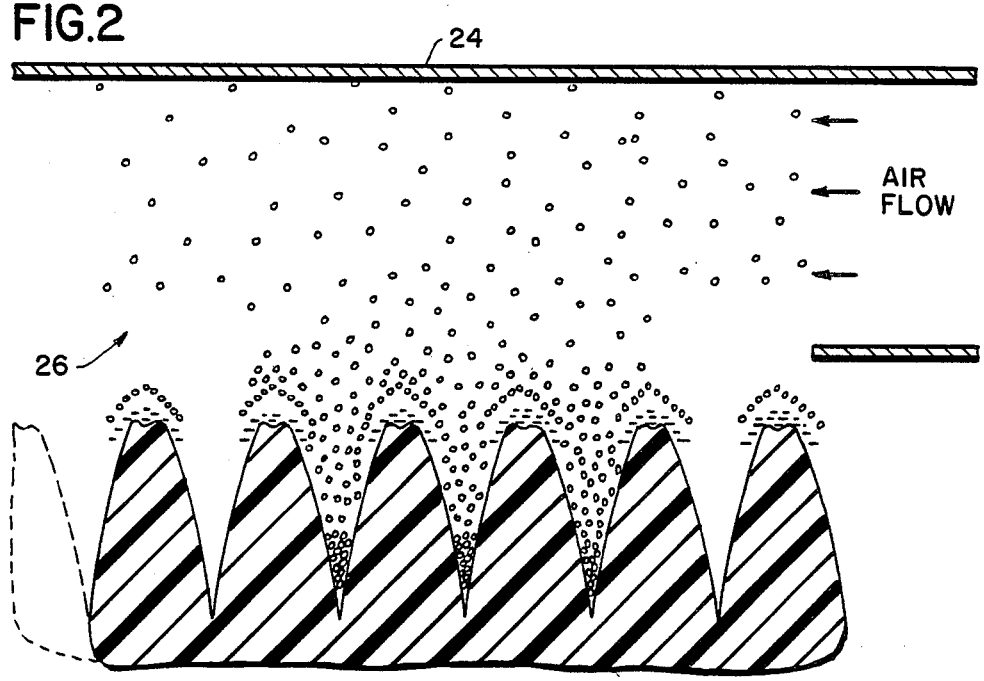
FIG. 2 illustrates selective deposition of charged light-absorbing particles in grooves of the screen.

After charging, the screen is transported to a particle supply station where the particles are deposited in the grooves. One method of deposition is shown in FIG. 2, where a cloud of uniformly-distributed, negatively-charged particles is continuously circulated in an enclosure 24 having an opening 26 disposed above the screen through which the particles drop, under the influence of gravity, onto the screen. As the particles approach the screen, they are repelled by the negative charges on the peaks and fall into the grooves. Alternatively, the particles can be carried to a position above the screen by means such as a conductive plate to which they are attracted by an applied positive potential, and subsequently released by reversing the polarity of the applied potential. As another alternative, the screen can be inverted above a container of the negatively charged particles, and the particles can be attracted into the grooves by a positive potential applied to a conductive plate temporarily attached to the back side of the screen.

A wide range of suitable particle sizes and compositions is available for deposition, as is described in the above-mentioned U.S. Pat. No. 4,605,283 to Stanton. Especially suitable for electrostatic guidance into the grooves of a typical screen having a peak-to-peak spacing of approximately 300 microns are relatively-small particles, such as 0.5 micron diameter particles available from International Business Machines Corporation under part no. 1669070. Such small particles are easily repelled by the electrical charge on the peaks, statistically tend to uniformly fill the multiplicity of grooves, and have very small points of contact with the sidewalls of the lenticules, thus minimally influencing TIR.

Figure 3:
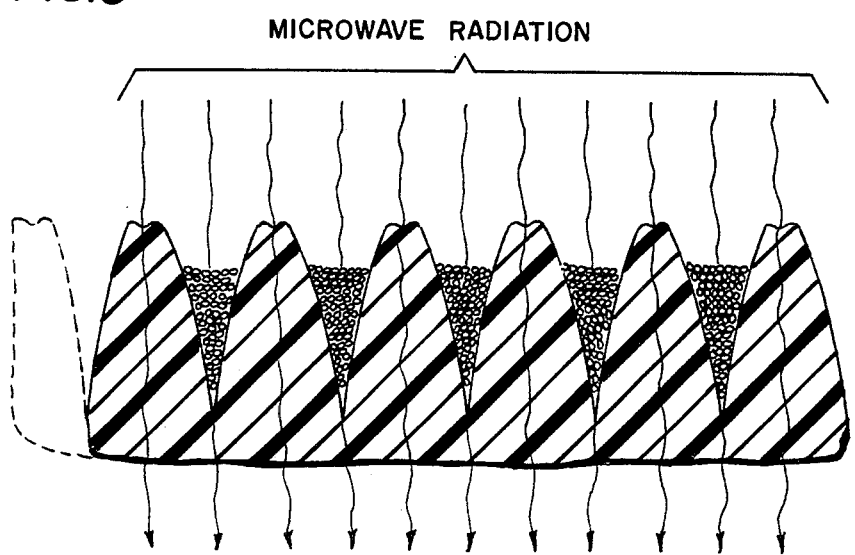
FIG. 3 illustrates heating of the deposited particles by microwave radiation.

After deposition of the particles in the grooves, the screen is moved to an affixing station, as is illustrated in FIG. 3. At this station, the screen and the particles in the grooves are transfused with microwave radiation of sufficient energy to fuse the particles to each other and to the screen, without optically distorting the lenticules. The energy expended will depend on the size of the screen, the particle diameters, and the relative arrangement of the microwave source and the screen.

In a test of the microwave heating step, particles were deposited in the grooves of a 4.0 cm×3.7 cm screen by simply dropping the particles onto the screen and wiping off any particles landing on the peaks, as is disclosed in the Stanton patent. The particles had a diameter of about 75 microns, and were obtained from 3M Company of St. Paul, Minn. under part no. 50814-55. The deposited particles were optimally heated to fusion in a NORELCO Model 7100 microwave oven which was operated at 650 watts of microwave output power for four minutes. When heated for less than three minutes there was insufficient fusion of the particles to securely affix them in the grooves. When heated for over four minutes the particles tended to lose their spherical shape and made contact with substantial areas of the lenticule side walls, thereby adversely affecting TIR.

Although the invention has been described with reference to a particular embodiment, numerous modifications can be made without departing from the scope of the invention, as is set forth in the appended claims. For example, other types of particles could be used, such as metallic particles coated with plastic, or solid plastic particles of a composition which absorbs microwave energy. Also, the peaks of the lenticules can be charged by other techniques, such as by rubbing the peaks with a material such as polyethylene.

I claim:

1. A method for selectively applying light-absorbing particles to a light-transmissive screen having a surface contoured to include a multiplicity of raised lenticules having respective peaks and sidewalls, said sidewalls defining grooves between the lenticules, said method comprising the steps of:
- (a) electrostatically charging the lenticule peaks with a charge having a predetermined polarity;
- (b) depositing onto the screen a quantity of the light-absorbing particles, said particles having a substantially higher microwave absorption coefficient than the screen material, having heat-fusible outer surfaces, and being charged to the same polarity as the lenticule peaks to effect repulsion of the particles from the peaks and into the grooves; and
- (c) transfusing the screen and the deposited particles with microwave radiation of sufficient energy to fuse the particles to each other and to the screen, but of insufficient energy to optically distort the screen.

2. A method as in claim 1 where the lenticule peaks are charged by a corona discharge.

3. A method as in claim 1 where the lenticule peaks are charged by rubbing the peaks with polyethylene.

4. A method for selectively applying light-absorbing particles to a light-transmissive screen having a surface contoured to include a multiplicity of raised lenticules having respective peaks and sidewalls, said sidewalls defining grooves between the lenticules, said method comprising the steps of:
- (a) operating a corona discharge device near the lenticule peaks to apply thereto an electrical charge having a predetermined polarity;
- (b) conveying to the screen a quantity of the light-absorbing particles, said particles having a substantially higher microwave absorption coefficient than the screen material, having heat fusible outer surfaces, and having a charge of the same polarity as that applied to the lenticule peaks, thereby effecting repulsion from the peaks and into the grooves, said deposition continuing until the grooves are filled to a level sufficient to substantially cover the sidewalls; and
- (c) transfusing the screen and the deposited particles with microwave radiation of sufficient energy to fuse the particles to each other and to the screen, but of insufficient energy to optically distort the screen.

5. A method for selectively applying light-absorbing particles to a light-transmissive screen having a surface contoured to include a multiplicity of raised lenticules having respective peaks and sidewalls, said sidewalls defining grooves between the lenticules, said method comprising the steps of:
- (a) situating the screen at a charging station and applying an electric charge having a predetermined polarity to the lenticule peaks;
- (b) moving the screen to a particle supply station where the light-absorbing particles are conveyed to the screen until a quantity of said particles is deposited on the screen, said particles having a substantially higher microwave absorption coefficient than the screen material, having heat fusible outer surfaces, and being charged to the same polarity as the lenticule peaks to effect repulsion from the peaks and into the grooves, said deposition continuing until the grooves are filled to a level sufficient to substantially cover the sidewalls;
- (c) moving the screen to an affixing station where the screen and the deposited particles are transfused with microwave radiation of sufficient energy to fuse the particles to each other and to the screen, but of insufficient energy to optically distort the screen.

6. A method as in claim 1, 4 or 5 where the lenticule peaks have indented central portions.

7. A method as in claim 1, 4 or 5 where, before transfusing the screen and deposited particles with microwave radiation, the lenticule peaks are wiped to effect removal of any excess light-absorbing particles.

8. A method as in claim 1, 4 or 5 where particles have a nominal diameter between 0.5 microns and 75 microns.

9. A method as in claim 1, 4 or 5 where the particles comprise inner, magnetically-permeable cores surrounded by outer, heat-fusible light-absorbing coatings.

* * * * *

UNITED STATES PATENT AND TRADEMARK OFFICE
CERTIFICATE OF CORRECTION

PATENT NO. : 4,725,448
DATED : February 16, 1988
INVENTOR(S) : Brian J. Fitzpatrick It is certified that error appears in the above-identified patent and that said Letters Patent is hereby corrected as shown below:

IN THE TITLE

Change "APPLICATION OF ELECTRICALLY-CHARGED LIGHT-ABSORBING PARTICLES TO A LENTICULAR SCREEN" to --SELECTIVE APPLICATION OF ELECTRICALLY-CHARGED LIGHT-ABSORBING PARTICLES TO A LENTICULAR SCREEN--

Signed and Sealed this

Twenty-first Day of March, 1989

Attest:

DONALD J. QUIGG

Attesting Officer

Commissioner of Patents and Trademarks